Figure 1:
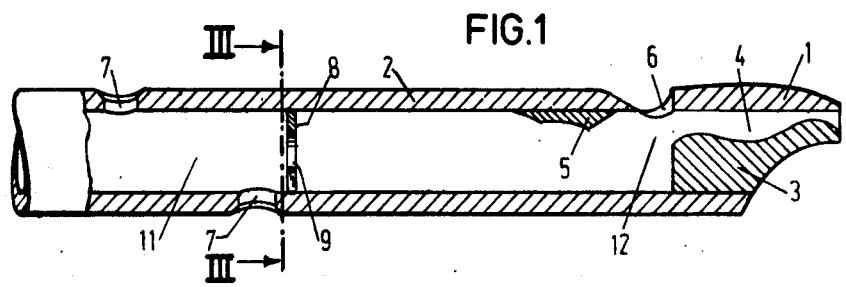

United States Patent
Visser

[11] 3,722,348
[45] Mar. 27, 1973

[54] WIND INSTRUMENT
[76] Inventor: Hendrik Visser, Duinweg 37A, Schoorl, Netherlands
[22] Filed: May 1, 1972
[21] Appl. No.: 249,182

[52] U.S. Cl................................84/380, 84/384
[51] Int. Cl..............................G10d 7/00
[58] Field of Search................84/380, 384, 386, 375

[56] References Cited

UNITED STATES PATENTS 2,598,268  5/1952  Kendrick.....................84/380 X
3,011,382  12/1961 Kim..............................84/384

FOREIGN PATENTS OR APPLICATIONS 582,347  11/1946  Great Britain....................84/384

Primary Examiner—Richard B. Wilkins
Assistant Examiner—John F. Gonzales
Attorney—John P. Snyder et al.

[57] ABSTRACT

A wind instrument having an embouchure and a resonance passage in which between the embouchure and the resonance passage an antechamber is disposed which is bounded at one end by a plate (tone ring), attached to the wall of the resonance passage transversely of the instrument axis and formed with an aperture, and at the other end by a tongue in the form of one or more raised portions extending from the wall downstream of the embouchure.

4 Claims, 5 Drawing Figures

PATENTED MAR 27 1973          3,722,348

300
WIND INSTRUMENT

The invention relates to a wind instrument having an embouchure and a resonance passage. It is an object of the invention to provide a wind instrument of the kind specified which allows very flexible intonation. According to the invention, disposed between the embouchre and the resonance passage is an antechamber which is bounded at one end by a plate (tone ring), attached to the wall of the resonance passage transversely of the instrument axis and formed with an aperture, and at the other end by a tongue in the form of one or more raised portions extending from the wall downstream of the embouchure a wind instrument of the kind specified allows very flexible intonation both as regards blowing and dynamics. The instrument has the surprising feature that its pitch does not change as a result of change in temperature of formation of condensation.

The invention also relates to a wind instrument of the kind specified in the form of a flute having an axially directed embouchure, a resonance passage having a number of closable apertures, and a tone hole disposed between the embouchure and the resonance passage. According to the invention the antechamber is disposed between the tone hole and the resonance passage, the tongue is formed at the other end of the antechamber by a downwardly directed raised portion of the antechamber wall which extends in the direction of the tone hole and then at an inclination, reaching zero height at the edge of the tone hole, and the embouchure is formed by a tube segment, adjoining the tone hole and formed on the inside with a gutter-shaped channel extending in the direction of the tongue, and by an at least partly open passage under the tube segment. A flute of this kind can readily cover a range of three octaves without use of the keys and can also be blown in a completely relaxed manner.

According to the invention, the tube segment adjoining the tone hole can be open on the underside, and below the tone hole the body of the flute can have a completely unobstructed passage whose edge merges with the base of the tube segment and has an outer periphery with a stepped shape such that the outwardly directed edge of the aperture has a small wall thickness. In a construction of this kind no block is required. The stepped edge forms a tensioning ring for the player's lip, enabling him to blow softly for the high octaves and heavily for the low octaves.

According to the invention, the tone ring can be formed with a keyhole-shaped aperture, comprising a round central aperture adjoined by a downwardly directed radial groove extending to the wall. When the tone ring is formed with an aperture in this way the flute acquires a good timbre, and condensation can be readily removed, condensation moisture being uniformly distributed over the wall past the tone ring.

Figure 2:
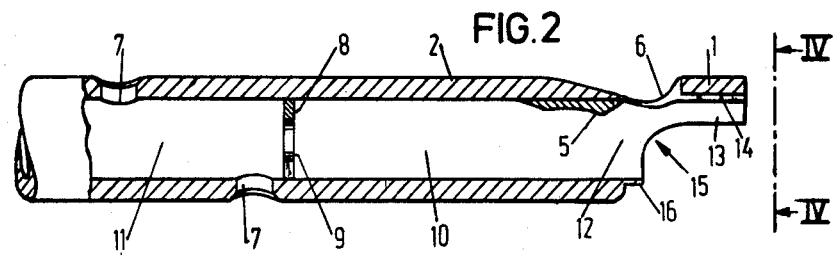
Figure 3:
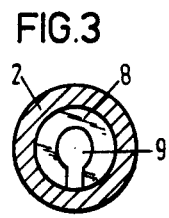
Figure 4:
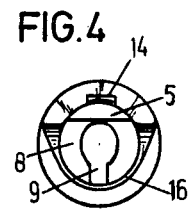
Figure 5:
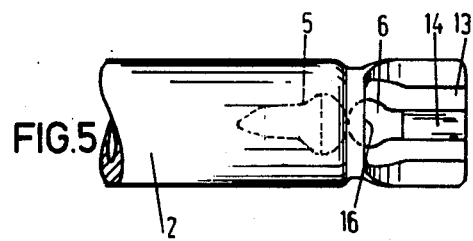

A number of exemplary embodiments of the invention will now be described in greater detail with reference to the drawings, wherein:

FIG. 1 is a partially sectioned longitudinal view of a flute according to the invention, FIG. 2 is a partially sectioned longitudinal view of a variant embodiment of a flute, FIG. 3 is a section, taken along the line III—III in FIGS. 1 and 2, FIG. 4 is a section, taken along the line IV—IV in FIG. 2 and FIG. 5 is a bottom plan view corresponding to FIG. 2.

Referring to FIG. 1, a flute comprises a mouthpiece 1 and an adjoining tube 2. The mouthpiece has a block 3 cooperating with the top wall of the tube to form a blowing passage 4. The blowing passage 4 extends in the direction of a tongue 5 in the form of a raised portion extending from the tube wall just downstream of a tone hole 6. At its end remote from the mouthpiece 1 the tube is formed with a number of apertures 7 which can be opened or closed as required by the player's fingers. The tube is subdivided by a partition in the form of a plate 8 formed with a keyhole-shaped aperture 9 into two chambers, namely an antechamber 10 between the plate 8 and the mouthpiece 1, and a resonance chamber 11 on the other side of the plate 8. That portion of the tube which is disposed between the tongue 5 and the mouthpiece 1 forms an intonation chamber 12. When the flute is blown via the blowing passage 4 partial notes are produced in the intonation chamber and cause resonance notes to sound in the resonance chamber 11. The special connection of the intonation chamber 12 to the resonance chamber 11 via the antechamber 10 and the tone ring formed by the plate 8 formed with the aperture 9 gives flute according to the invention its special properties.

In the embodiment illustrated in FIG. 2 the flute also has a mouthpiece 1, a tone hole 6, a tongue 5, an intonation chamber 12, an antechamber 10, a tone ring 8, 9 and a resonance chamber 11. The flute mainly consists of a tube 2, the resonance chamber being formed in that part of the tube which is formed with apertures 7. In this embodiment the mouthpiece 1 consists of a tube segment 13 open on the underside and formed on the inside with a gutter-shaped channel 14. The tube segment has a partially open passage on its underside. The body 2 of the tube has beneath the tone hole a completely unobstructed passage 15 whose edge is formed by a stepped edge 16 of the body 2 of the tube, so that the outwardly pointing end thereof has a small wall thickness. When the flute is played, the underside of the tube segment is closed by the player's lower lip, which is supported against edge 16 acting as a tensioning edge. In cooperation with the player's lower lip the gutter-shaped aperture 14 then forms a blowing passage extending in the direction of the tongue 5. The tensioning ring 16 enables the player to blow in a very relaxed fashion and he can blow the high octaves gently and the low octaves heavily.

What I claim is:

1. A wind instrument having an embouchure and a resonance passage, characterized in that disposed between the embouchure and the resonance passage is an antechamber which is bounded at one end by a plate attached to the wall of the resonance passage transversely of the instrument axis and formed with an aperture, and at the other end by a tongue in the form of one or more raised portions extending from the wall downstream of the embouchure.

2. A wind instrument as set forth in claim 1 in the form of a flute having an axially directed embouchure, a resonance passage having a number of closable apertures, and a tone hole disposed between the embouchure and the resonance passage, characterized in that the antechamber is disposed between the tone hole and the resonance passage, the tongue is formed at the other end of the antechamber by a downwardly directed raised portion of the antechamber wall which extends in the direction of the tone hole, and then at an inclination, reaching zero height at the tone hole edge, and the embouchure is formed by a tube segment, adjoining the tone hole and formed on the inside with a gutter-shaped channel extending in the direction of the tongue, and by an at least partly open passage under the tube segment.

3. A wind instrument as set forth in claim 2, characterized in that the tube segment adjoining the tone hole is open on the underside, and below the tone hole the body of the flute has a completely unobstructed passage whose edge merges with the base of the tube segment and has an outer periphery with a stepped shape such that the outwardly directed edge of the aperture has a small wall thickness.

4. A wind instrument as set forth in claim 1, characterized in that said plate is formed with a keyhole-shaped aperture.

* * * * *